INVENTOR
ALBRECHT MOSCHEL

BY
ATTORNEYS

United States Patent Office 3,640,962
Patented Feb. 8, 1972

3,640,962
POLYESTER POLYCONDENSATION PROCESS
UNDER DECREASING TEMPERATURES
Albrecht Moschel, Kelkheim, Taunus, Germany, assignor to Farbwerke Hoechst Aktiengesellschaft vormals Meister Lucius & Brüning, Frankfurt am Main, Germany
Filed Apr. 28, 1969, Ser. No. 819,842
Claims priority, application Germany, May 8, 1968, P 17 70 350.3
Int. Cl. C08g 17/01
U.S. Cl. 260—75 M                                   7 Claims

ABSTRACT OF THE DISCLOSURE

Process for the manufacture of polyesters containing free hydroxyl groups and having an acid number below 0.4 by condensing at least one dicarboxylic acid with at least one diol in a molar ratio of from 1:1.14 to 1:1.35 in the presence of a condensation catalyst, removing the main quantity of the water of condensation in a current of an inert gas under a pressure of 1,000 to 700 mm. of mercury and after-condensing under reduced pressure, which comprises reducing in stages or continuously during after-condensation the temperature in the range of from 210° C. to 165° C., and the pressure of from 800 to 1 mm. of mercury.

---

Figure 1:
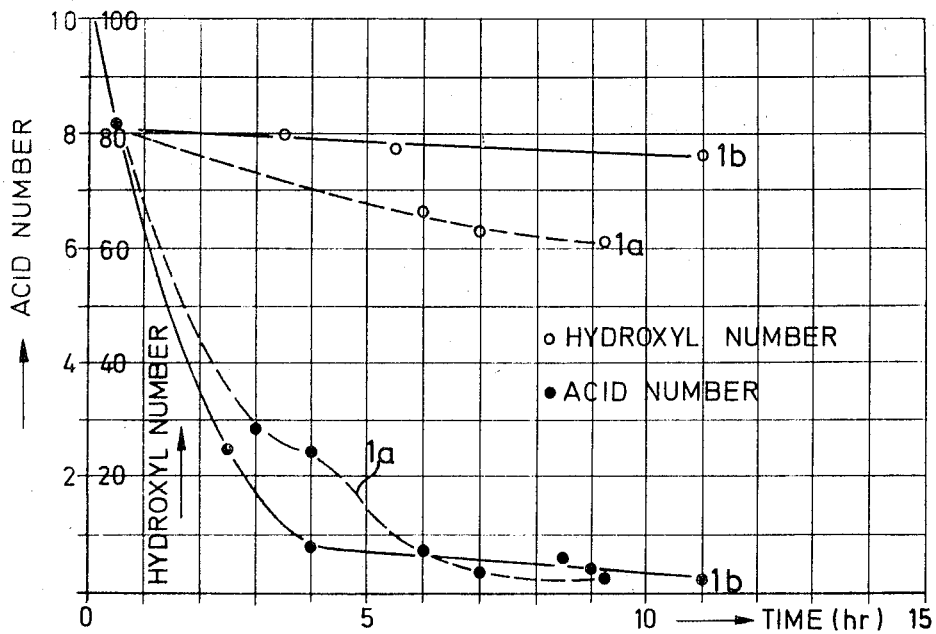

The present invention relates to polyesters containing free hydroxyl groups and having an acid number below 0.4 and to a process for preparing the said polyesters.

The preparation of linear saturated polyesters by reacting dicarboxylic acids with diols is of great industrial importance and known for a long time. To prepare polyethylene adipinate from glycol and adipic acid, for example, the main quantity of the condensation water is first expelled by gradually heating the reaction mixture from 140 to 200° C. in a current of an inert gas, cooling to 150° C., producing a water-jet vacuum, after having reached the full vacuum slowly increasing the condensation temperature again to 200° C. within the course of several hours. According to this process polyesters are obtained in about 14 to 16 hours having an acid number of about 1 and a hydroxyl number which approximately corresponds to the value calculated on the amount of glycol used. To obtain polyesters having an acid number substantially below 1, as desired for the manufacture of urethane prepolymers, long periods of time are necessary, the hydroxyl number is strongly reduced and considerable amounts of diol are lost. To accelerate the condensation it has been proposed to add metal oxides, salts or esters, alkyl orthotitanates being especially favorable (cf. U.S. Pat. 2,822,348, as well as U.S. Pat. 2,727,881 and German Auslegeschrift 1,149,532).

Numerous attempts have been made to carry out the condensation of dicarboxylic acids with diols with a higher space-time yield. In German Auslegeschrift 1,209,743 a continuous condensation process is described in which, while maintaining the condensation temperature, the pressure is reduced in stages in reaction vessels correspondingly connected in series. In this process polyesters are also obtained the acid number of which is not essentially below 2 and the hydroxyl number of which is about 27% below the value calculated on the amount of diol used. The diol distilled off with the water can only be recovered in a complicated purification process and used again. The difficulties are especially serious when not only one diol but two or more diols having different vapor pressures are used, for example in the manufacture of polyesters for producing fibrous or sheet-like poly-urethane, urea and hydrazide structures with tailored mechanical properties. In this case the process described in German Auslegeschrift 1,209,743 yields not only considerable amounts of distillate of difficultly separable diols, but also polyesters with a completely indefinite structure because in the course of the manufacture they are depleted of lower boiling diols.

The present invention provides a process for the manufacture of polyesters having free hydroxyl groups and an acid number below 0.4 by polycondensing one or several dicarboxylic acids with 4 to 10 and preferably 6 carbon atoms with one or several dihydric alcohols with 2 to 10 and preferably 4 to 8 carbon atoms which may be interrupted one to three times by an oxygen atom, in a molar ratio of from 1:1.4 to 1:1.35 in the presence of oxides, salts or esters of metals of main Groups 2 to 5 and Subgroups 2 to 4 of the Periodic Table, preferably in the presence of oxides, salts or esters of titanium, while distilling off the main quantity of the condensation water in a current of an inert gas under a pressure of from 1,000 to 700 mm. of mercury and after-condensing under reduced pressure, which comprises reducing during the course of the after-condensation in stages or gradually the temperature in the range of from 210° C. to 165° C., preferably from 200 to 175° C. and the pressure in the range of from 800 to 1 mm. of mercury, preferably from 780 to 5 mm. of mercury. An especially advantageous variant of the process of the invention consists in reducing in stages or gradually the temperature within the course of at least 2 hours in the range of from 200 to 180° C. and the pressure to 100–10 mm. of mercury and subsequently condensing for at least a further 2 hours under a pressure of 10–5 mm. of mercury.

The process of the invention permits not only the industrial manufacture of polyesters containing hydroxyl groups and having a very low acid number in a high space-time yield, but also the synthesis of polyesters with predetermined molecular weight, narrow molecular weight distribution and defined composition. The process of the invention offers an important industrial advance because during condensation the losses of diol are kept very low so that the distillates need not be worked up. Moreover, it is very simple to produce polyesters with special mechanical properties as required in the manufacture of elastomers using polyurethane prepolymers. Owing to the fact that it can be carried out in discontinuous manner in one or two vessels or in a continuous polyester manufacturing device, it permits the manufacture of small or large amounts of the special polyesters as required in the usual condensation apparatus without additional expenditure.

Suitable dicarboxylic acids used in the process of the invention are, for example, succinic acid, glutaric acid, pimelic acid, suberic acid, azelaic acid, and sebacic acid, preferably, however, adpic acid.

Dihydric alcohols to be used in the process of the invention are linear and cyclic diols having 2 to 10 and preferably 4 to 8 carbon atoms which may be interrupted one to three times by an oxygen atom, such as, for example, ethylene glycol, butane-diol-1,4, hexane-diol-1,6, 2-methylhexane-diol-1,6, 1,4-dimethylolcyclohexane, diethylene glycol, triethylene glycol and dibutylene glycol, either alone or in admixture with one another. Especially good results are obtained with dibutylene glycol alone or in admixture with triethylene glycol and 1,4-dimethylolcyclohexane.

As condensation catalysts there can be used oxides, salts or esters of metals of main Groups 2 to 5 and Subgroups 2 to 4 of the Periodic Table, preferably oxides, salts and esters of titanium, and more preferably alkyl orthotitanates, in a concentration in the range of from 0.005 to 0.5, preferably 0.01 to 0.1% by weight, calculated on the mixture consisting of dicarboxylic acid and diol. According to a preferred mode of execution of the process of the invention the catalyst is stirred into the melt of the starting mixture either alone or in the form of a 1 to 50% by weight solution in the diol or mixture of diols prior to the separation of water.

The condensation is carried out in the usual flasks or vessel with stirrers. When operating on an industrial scale the components are preferably reacted in a two stage process to increase the space-time yield. In the first vessel the reaction mixture is melted and mixed and the main quantity of the water of condensation is expelled at a temperature in the range of from 130 to 220° C., preferably 135 to 200° C. while passing over nitrogen. In the second vessel designed to withstand a reduced pressure down to 0.1 mm. of mercury, the after-condensation is carried out with stepwise or gradual reduction of temperature and pressure. During this period a new batch can be melted in the first vessel. In the second vessel the temperature and pressure can be reduced automatically according to a predetermined system. The end of the condensation is determined and the quality of the ester controlled by analytical determination of acid number and hydroxyl number. During condensation samples can be taken to control the variations of acid number and hydroxyl number. From the amount of distillate and its gas chromatographic analysis conclusions can be drawn, especially when several diols are used, as to the complete or partial incorporation of the individual diols into the polyester and the exact program of the temperature and pressure reduction can be established accordingly.

Figure 2:
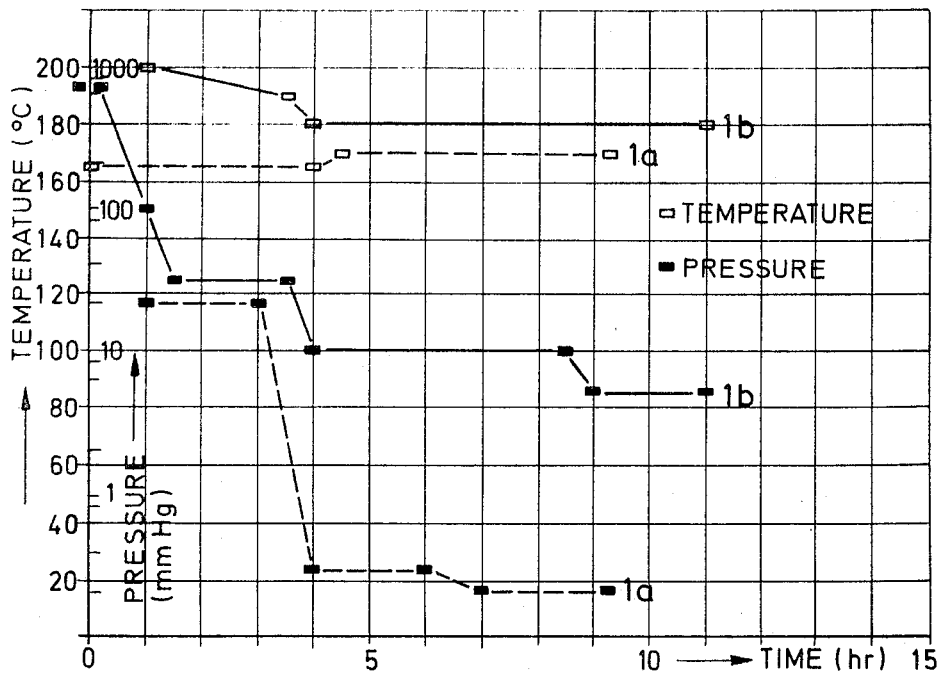

The accompanying tables and graphs, wherein FIG. 1 shows the relation of acid number and hydroxyl number to time, and FIG. 2 shows the relation of temperature and pressure to time, show that it is only possible by the process of the invention to produce polyesters in a high space-time yield without loss of diol or a component of the diol mixture and having the desired low acid number.

Experiment 1 reveals, for example that a linear polyester of adipic acid and dibutylene glycol can only be obtained without substantial reduction of the hydroxyl number and with the desired acid number of 0.3 when within the indicated period of time the pressure as well as the temperature are gradually reduced (1b). If only the temperature is reduced and at first a low temperature is maintained which is then increased, the condensation takes place with a considerable loss of diol and a polyester of low hydroxyl number is obtained (1a).

Experiment 2 illustrates the influence of the step-wise (2b) and the sudden (2a) reduction of the pressure with a slight reduction of the temperature from 184° C. to 180° C. Only in the case of the pressure being slowly reduced in stages a linear polyester having the desired hydroxyl number can be produced, the molecular weight of which is within the desired range.

Experiment 3 relates to the production of an adipic acid ester from a mixture of three diols, i.e. dibutylene glycol, triethylene glycol and dimethylolcyclohexane. A slow decrease of the temperature within the first 3 hours from 195° C. to 180° C. combined with a very slow reduction of the pressure yields a polyester which only loses traces of one diol component even with prolonged heating.

Experiment 4 compares the production of a polyester of succinic acid and a mixture of triethylene glycol and dimethylolcyclohexane at constant temperature and under constantly reduced pressure (4a) with the production of a polyester with simultaneous reduction in stages of temperature and pressure (4b). In this case, too, the process of the invention has distinct advantages over the known method (a) in that the hydroxyl number is not substantially reduced with depletion of triethylene glycol but only slightly lowered.

Experiment 5 describes the production of a sebacic acid ester with a diol mixture of dimethylolcyclohexane and triethylene glycol. Slow decrease of the temperature within the first 4½ hours to 180° C. combined with a very slow decrease of the pressure yields a polyester which can be condensed until an acid number of 0.05 is reached without the hydroxyl number being reduced.

It can be seen that in all cases the process of the invention yields polyesters having very low acid numbers, a predefined hydroxyl number and a composition corresponding to the composition of the mixture of the starting components.

The following examples and diagrams showing the course of temperature and pressure and the variations of acid number and hydroxyl number serve to illustrate the invention but they are not intended to limit it thereto.

EXAMPLE 1

(1a) Comparative example 186 kilograms of dibutylene glycol and 136.5 kilograms of adipic acid were introduced into a 500 liter vessel provided with stirrer, nitrogen inlet and mounted column having a height of 1 meter, filled with Raschig rings and provided with condenser. After melting of the acid 200 grams of n-butyl-o-titanate dissolved in 1 kilogram of dibutylene glycol were stirred in at 100° C. While passing over about 500 liters per hour of nitrogen the reaction mixture was heated with the aid of a heated and circulated oil having a temperature of 212 to 215° C. At an internal temperature of 135° C. the separation of water set in. Within the course of 2 hours the internal temperature rose to at almost 210° C. 30.6 liters of water separated over a period of 4½ hours, a further 0.6 liter separated during another 2 hours. Through a bottom valve the polyester was forced into a pre-heated autoclave having a capacity of 500 liters.

The internal temperature of the autoclave was adjusted at 165° C., and, while stirring and with the aid of a steam jet vacuum pump and a pressure regulator, a pressure of 20 mm. of mercury was gradually adjusted within the course of 1 hour. The pressure was maintained for 2 hours, then within 15 minutes a pressure of 1 mm. of mercury was adjusted and with a further 45 minutes a pressure of 0.3 mm. of mercury was adjusted. The pressure was maintained for 2 hours at said level, the mixture was heated for 195 minutes under 0.2 mm. of mercury, during the last 345 minutes the internal temperature in the autoclave being raised to 170° C. The course of temperature and pressure, and the variations of acid number and hydroxyl number are indicated in Table 1a and FIGS. 1 and 2.

| Time (Σ hrs.) | Temp. (° C.) | Pressure (mm. Hg) | Acid number | Hydroxyl number |
|---|---|---|---|---|
| 0–1 | 165 | 760–20 | | |
| 1 | 165 | 20 | | |
| 3 | 165 | 20 | 2.59 | |
| 3–4 | 165 | 20–0.3 | | |
| 4 | 165 | 0.3 | 2.45 | |
| 4½ | 165 | 0.3 | | |
| 4½–4¾ | 165–170 | 0.3 | | |
| 6 | 170 | 0.3/0.2 | 0.75 | 66 |
| 7 | 170 | 0.2 | 0.38 | 63 |
| 9¼ | 170 | 0.2 | 0.30 | 61 |

After termination of the condensation, 265 kilograms of a linear polyester of adipic acid and dibutylene glycol having an acid number of 0.3 and a hydroxyl number of 61 were obtained.

(1b) Example according to invention

The experiment was repeated and the precondensation carried out as described in Example 1a. The after-condensation in the autoclave was carried out under the following conditions:

The internal temperature was adjusted at 198° C., maintained at that level for 1 hour, reduced to 190° C. within the course of 30 minutes, again maintained at said level for 2 hours, then reduced to 180° C. during the course of 30 minutes and maintained at 180° C. for 1 hour. According to the simultaneous vacuum program the pressure was reduced in stages. Within the course of 30 minutes a pressure of 100 mm. of mercury was adjusted, the mixture was stirred for 30 minutes under said pressure, next a pressure of 30 mm. of mercury was slowly adjusted within a further 30 minutes, the said pressure was maintained for 2 hours, within 30 minutes a pressure of 10 mm. of mercury was slowly adjusted, the reaction mixture was stirred for 270 minutes under said pressure, then a pressure of 5 mm. of mercury was adjusted within 30 minutes and the mixture was stirred for a further 2 hours under the latter pressure. The course of temperature, pressure and the variations of acid number and hydroxyl number are shown in the following Table 1b and FIGS. 1 and 2.

| Time (Σ hrs.) | Temp. (°C.) | Pressure (mm. Hg) | Acid number | Hydroxyl number |
|---|---|---|---|---|
| 0–½ | 198 | 760–100 | | |
| ½ | 198 | 100 | 82 | |
| 1 | 198 | 100 | | |
| 1–1½ | 198–190 | 100–30 | | |
| 1½ | 190 | 30 | | |
| 2½ | 190 | 30 | 2.5 | |
| 3½ | 190 | 30 | | 79.9 |
| 3½–4 | 190–180 | 30–10 | | |
| 4 | 180 | 10 | 0.8 | |
| 5½ | 180 | 10 | | 77.3 |
| 8½ | 180 | 10 | 0.65 | |
| 8½–9 | 180 | 10–5 | | |
| 9 | 180 | 5 | 0.45 | |
| 11 | 180 | 5 | 0.30 | 75.5 |

After termination of the condensation 270.5 kilograms of a linear polyester of adipic acid and dibutylene glycol having an acid number of 0.30 and a hydroxyl number of 75.5 were obtained.

EXAMPLE 2

(2a) Comparative example

A 2 liter four-necked flask provided with stirrer, thermometer, nitrogen inlet and condenser, was charged with 500 grams of dibutylene glycol and 365 grams of adipic acid. After melting of the acid, 250 milligrams of n-butyl-titanate were added and, while stirring and passing over 200 liters per hour of nitrogen, the flask was heated over a period of 90 minutes at a bath temperature of 210° C. At an internal temperature of 135° C. the separation of water set in during which the internal temperautre rose to 185° C. After a total period of 4 hours 87 milliliters of water had separated. The condenser was then removed and a vacuum was produced over a cooling trap to perform after-condensation.

After-condensation was started under a pressure of 20 mm. of mercury at 184° C., the mixture was kept under said conditions for 3 hours, the pressure was then reduced to 1 mm. of mercury, the temperature was reduced to 180° C. and the mixture was maintained under these conditions for 8 hours. The course of temperature, pressure and the variations of acid number and hydroxyl number are indicated in the following Table 2a.

| Time (Σ hrs.) | Temp. (°C.) | Pressure (mm. Hg) | Acid number | Hydroxyl number |
|---|---|---|---|---|
| 0 | 184 | 760/20 | 3.5 | |
| 2 | 184 | 20 | 1.5 | 74.9 |
| 3 | 184/180 | 20/1 | 0.4 | 73.9 |
| 4 | 180 | 1 | 0.28 | |
| 7 | 180 | 1 | 0.03 | 72.0 |
| 10 | 180 | 1 | 0.02 | 71.2 |
| 11 | 180 | 1 | 0.02 | 72.5 |

After termination of the condensation a linear polyester of adipic acid and dibutylene glycol having an acid number of 0.02 and a hydroxyl number of 72.5 was obtained.

(2b) Example according to the invention

The experiment was repeated and the pre-condensation carried out as described in Example 2a. The after-condensation was carried out with the following temperature and pressure program: The temperature was likewise maintained for 3 hours at 184° C. and then for 8 hours at 180° C. The pressure, however, was reduced to 100 mm. of mercury within the course of 2 hours, then reduced to 30 mm. of mercury within a further 30 minutes and maintained at said level for 90 minutes. Next, the pressure was reduced to 10 mm. of mercury within the course of 1 hour and maintained at 10 mm. of mercury for 4 hours, then reduced to 5 mm. of mercury and condensation was continued for 2 hours under the latter pressure. The course of temperature and pressure and the variations of acid number and hydroxyl number are indicated in the following Table 2b)

| Time (Σ hrs.) | Temp. (°C.) | Pressure (mm. Hg) | Acid number | Hydroxyl number |
|---|---|---|---|---|
| 0 | 184 | 760 | 18.0 | (83.0) |
| 0–1 | 184 | 760–200 | | |
| 1 | 184 | 200 | 5.0 | |
| 1–2 | 184 | 200–100 | | |
| 2 | 184 | 100 | 4.2 | (83.3) |
| 2–2½ | 184 | 100–30 | | |
| 2½ | 184 | 30 | 2.8 | 85.2 |
| 3 | 184/180 | 30 | | |
| 4 | 180 | 30 | 0.42 | |
| 4–5 | 180 | 30–10 | | |
| 5 | 180 | 10 | 0.30 | 85.2 |
| 9 | 180 | 10/5 | 0.01 | 85.2 |
| 11 | 180 | 5 | 0.01 | 84.6 |

After termination of the condensation a linear polyester of adipic acid and dibutylene glycol having an acid number of 0.01 and a hydroxy number of 84.6 was obtained.

EXAMPLE 3

A 2 liter four-necked flask provided with stirrer, thermometer, nitrogen inlet and condenser was charged with 584 grams of adipic acid, 317 grams of dibutylene glycol, 293 grams of triethylene glycol and 144 grams of 1,4-dimethylolcyclohexane. After melting of the acid 300 milligrams of n-butyl titanate were added and the flask was heated whilst stirring and passing over 200 liters per hour of nitrogen over a period of 90 minutes to a bath temperature of 205° C. At an internal temperature of about 140° C. separation of water set in during the course of which the internal temperature rose to 195° C. After a total period of 4 hours 140 milliliters of water had separated. The condenser was removed and a vacuum pump was connected over two cooling traps cooled with liquid nitrogen. The after-condensation was carried out with the following temperature and pressure program: within the course of 3 hours the internal temperature was reduced from 195° C. to 180° C. and the mixture was condensed for 9 hours at said temperature. The pressure was reduced to 200 mm. of mercury within the first 15 minutes, maintained at said level for 105 minutes, then kept for 1 hour at 100 mm. of mercury, the mixture was stirred for 30 minutes under 30 mm. of mercury, then for 2 hours under 10 mm. of mercury, for 4 hours under 5 mm. of mercury and finally for 150 minutes under 1 mm. of mercury. The course of temperature and pressure and the variations of acid number and hydroxyl number are indicated in the following Table 3.

| Time (Σ hrs.) | Temp. (°C.) | Pressure (mm. Hg) | Acid number | Hydroxyl number |
|---|---|---|---|---|
| 0 | 195 | 760 | 1.21 | |
| 0–¼ | 195 | 760–200 | | |
| ¼ | 195 | 200 | | |
| ¼–2 | 195–185 | 200 | | |
| 2 | 185 | 200 | | |
| 2–3 | 185–180 | 200–100 | | |
| 3–3½ | 180 | 100–30 | | |
| 3½ | 180 | 30 | 0.13 | 75.4 |
| 3½–4½ | 180 | 30–10 | | |
| 5½ | 180 | 10/5 | | |
| 9½ | 180 | 5/1 | | |
| 12 | 180 | 1 | 0.03 | 74.8 |

After having condensed for 12 hours 1.1 kilograms of a mixed ester of adipic acid with dibutylene glycol, triethylene glycol and 1,4-dimethylolcyclohexane were obtained having the original composition as the gas chromatographic separation of the content of the cooling traps only indicated 0.5% of triethylene glycol besides water.

EXAMPLE 4

(4a) Comparative example

A 1 liter, four-necked flask equipped as described in Example 3 was charged with 236 grams of succinic acid, 118.5 grams of 1,4-dimethylolcyclohexane and 246 grams of triethylene glycol and after melting of the acid 150 milligrams of n-butyl titanate were added. Whilst stirring and passing over 200 liters per hour of nitrogen the flask was heated over a period of 90 minutes to a bath temperature of 210° C. At an internal temperature of about 140° C. separation of water set in during the course of which the internal temperature rose to 200° C. After a total period of 4 hours, 79 milliliters of water had separated. The condenser was then removed and the flask was connected with a vacuum pump over two cooling traps cooled with liquid nitrogen.

The reaction mixture was after-condensed for 8 hours at 180° C. under a pressure of 1 mm. of mercury. The course of temperature and pressure and the variations of acid number and hydroxyl number are indicated in the following Table 4a)

| Time (Σ hrs.) | Temp. (° C.) | Pressure (mm. Hg) | Acid number | Hydroxyl number |
|---|---|---|---|---|
| 0 | 180 | 760/1 | 2.85 | |
| 1 | 180 | 1 | 0.84 | 73.0 |
| 5 | 180 | 1 | 0.29 | 73.5 |
| 8 | 180 | 1 | 0.03 | 60.0 |

After termination of the condensation, 460 grams of a linear polyester of succinic acid with 1,4-dimethylocyclohexane and triethylene glycol were obtained having an acid number of 0.03 and a hydroxyl number of 60.0, the composition of which polyester did not correspond to the original composition as the gas chromatographic separation of the conent of the cooling traps (14.6 grams) indicated 88.1% of triethylene glycol and 6.04% of dimethylolcyclohexane.

(4b) Example according to the invention

The experiment was repeated and the precondensation carried out as described in Example 4a. The after-condensation was carried out with the following temperature and pressure program. The temperature was first maintained at 200° C. for 90 minutes, then reduced to 190° within the course of 30 minutes, maintained at said level for 90 minutes, next reduced to 180° C. within the course of 1 hour and stirring of the mixture was continued for 270 minutes at said temperature.

The pressure was reduced to 100 mm. of mercury within the course of 30 minutes, kept at said level for 1 hour, then reduced to 30 mm. of mercury within the course of 30 minutes and the mixture was stirred under said pressure for 90 minutes, the pressure was reduced to 10 mm. of mercury within tre course of 30 minutes and condensation was continued for 270 minutes under the pressure of 10 mm. of mercury. The course of temperature and pressure as well as the variations of acid number and hydroxyl number are indicated in the following Table 4b

| Time (Σ hrs.) | Temp. (° C.) | Pressure (mm. Hg) | Acid number | Hydroxyl number |
|---|---|---|---|---|
| 0 | 200 | 760 | 3.5 | |
| 0–½ | 200 | 760–100 | | |
| ½ | 200 | 100 | | |
| 1½ | 200 | 100 | 1.42 | 84.4 |
| 1½–2 | 200–190 | 100–30 | | |
| 2 | 190 | 30 | | |
| 3½ | 190 | 30 | 0.46 | 82.1 |
| 3½–4 | 190–180 | 30–10 | | |
| 4 | 180 | 10 | | |
| 4½ | 180 | 10 | 0.15 | 81.7 |
| 8½ | 180 | 10 | 0.01 | 81.3 |

After termination of the condensation 460 grams of a linear polyester of succinic acid with 1,4-dimethylolcyclohexane and triethylene glycol having an acid number of 0.01 and a hydroxyl number of 81.3 were obtained, which in contradistinction to the polyester of Example 4a had practically the original composition as the gas chromatographic separation of the content of the cooling traps of 4.2 grams indicated 13.16% of triethylene glycol and 0.4% of dimethylolcyclohexane besides water.

EXAMPLE 5

A 1 liter, four-necked flask provided with stirrer, thermometer, nitrogen inlet and condenser was charged with 404 grams of sebacic acid, 118.5 grams of 1,4-dimethyolcyclohexane and 246 grams of triethylene glycol and after melting of the acid 150 milligrams of n-butyl titanate were added. Whilst stirring and passing over 200 liters per hour of nitrogen, the flask was heated within the course of 90 minutes to a bath temperature of 210° C. At an internal temperature of about 140° C. separation of water set in, during the course of which the internal temperature rose to 195° C. After a total period of 4 hours, 68 milliliters of water had separated. The condenser was then removed and the flask was connected with a vacuum pump over two cooling traps cooled with liquid nitrogen. The after-condensation was carried out with the following temperature and pressure program:

The mixture was maintained for 30 minutes at 200° C., the temperature was then reduced to 195° C. within the course of 1 hour, the said temperature was maintained for 30 minutes, the temperature was reduced to 190° C. within the course of 30 minutes, the mixture was kept at said temperature for 90 minutes, the temperature was then reduced to 180° C. within the course of 30 minutes and after-condensation was continued for 390 minutes at the latter temperature. In the first 30 minutes the pressure was reduced to 200 mm. of mercury, it was further reduced to 100 mm. of mercury within another 30 minutes, kept at said level for 30 minutes, then reduced to 30 mm. of mercury with 30 minutes, maintained at said level for 90 minutes, next reduced to 10 mm. of mercury within the course of 30 minutes, and after-condensation was continued for 270 minutes under a pressure of 10 mm. of mercury and then for 150 minutes under 5 mm. of mercury. The course of temperature and pressure and the variations of acid number and hydroxyl number are indicated in the following Table 5:

| Time (Σ hrs.) | Temp. (° C.) | Pressure (mm. Hg) | Acid number | Hydroxyl number |
|---|---|---|---|---|
| 0 | 200 | 760 | 5.6 | 89.8 |
| 0–½ | 200 | 760–200 | | |
| ½ | 200 | 200 | | |
| ½–1 | 200–197 | 200–100 | | |
| 1–1½ | 197–195 | 100 | | |
| 1½ | 195 | 100 | 0.84 | 88.7 |
| 1½–2 | 195 | 100–30 | | |
| 2 | 195 | 30 | | |
| 2–2½ | 195–190 | 30 | | |
| 3½ | 190 | 30 | 0.12 | 87.6 |
| 3½–4 | 190 | 30–10 | | |
| 4–4½ | 190–180 | 10 | | |
| 8½ | 180 | 10/5 | 0.08 | 85.2 |
| 11 | 180 | 5 | 0.05 | 84.5 |

The cooling traps contained 5.4 grams of a mixture 90% of which consisted of water.

After termination of the after-condensation, a linear polyester of sebacic acid with dimethylolcyclohexane and triethylene glycol was obtained having an acid number of 0.05 and a hydroxyl number of 84.5.

What is claimed is:

1. A process for preparing polyesters containing free hydroxyl groups and having an acid number below 0.4 obtained by polycondensation of at least one dicarboxylic acid selected from the group consisting of succinic acid, glutaric acid, pimelic acid, suberic acid, azelaic acid, sebacic acid and adipic acid with at least one dihydric alcohol having 2 to 10 carbon atoms wherein one to three oxygen atoms interrupt the carbon atoms of said alcohol, wherein the ratio of acid to alcohol is in a molar ratio of from 1:1.14 to 1:1.35, wherein said alcohol and acid are reacted in the presence of oxides, salts, or esters of metals of main Groups 2 to 5 and Subgroups 2 to 4 of the Periodic Table, wherein the major portion of water of condensation is separated by distillation aided by a current of an inert gas under a pressure of from 1,000 to 700 mm. of mercury and wherein said polycondensation product is subjected to after-condensation under reduced pressure, which comprises reducing in stages or gradually during the after-condensation the temperature in the range of from 210° C. to 165° C. and the pressure in the range of from 800 to 1 mm. of mercury and wherein the temperature is reduced in stages or gradually over a period of at least 2 hours in the range of from 200 to 180° C., and the pressure is reduced in stages or gradually over the same period of time to 100 to 10 mm. of mercury and the after-condensation is continued for at least 2 further hours under a pressure of from 10 to at least 5 mm. of mercury.

2. The process of claim 1, wherein the dihydric alcohol is selected from the group of ethylene glycol, butane-diol-1,4, hexane-diol-1,6, 2 - methylhexane - diol - 1,6, 1,4 - dimethylolcyclohexane, diethylene glycol, triethylene glycol and dibutylene glycol.

3. The process of claim 1, wherein a dicarboxylic acid having 6 carbon atoms is used.

4. The process of claim 1, wherein a dihydric alcohol having 4 to 8 carbon atoms is used.

5. The process of claim 1, wherein the condensation is carried out in the presence of oxides, salts or esters of titanium.

6. The process of claim 1, wherein the temperature during after-condensation is reduced in stages in the range of from 200 to 175° C.

7. The process of claim 1, wherein the pressure during after-condensation is reduced in stages or continuously in the range of from 780 to 5 mm. of mercury.

References Cited

UNITED STATES PATENTS

| | | | |
|---|---|---|---|
| 3,013,914 | 12/1961 | Willard | 154—43 |
| 2,071,250 | 2/1937 | Carothers | 260—106 |
| 2,071,251 | 2/1937 | Carothers | 18—54 |
| 3,075,952 | 1/1963 | Coover et al. | 260—75 |
| 3,330,809 | 7/1967 | Perlowski et al. | 260—75 |
| 3,396,149 | 8/1968 | Roedel et all. | 260—75 |
| 3,405,098 | 10/1968 | Heighton et al. | 260—75 |
| 3,438,942 | 4/1969 | Scheller | 260—75 |

OTHER REFERENCES

Fuller et al.: J. Am. Chem. Soc. 59, 344–45 (1937), Kirk-Othmer Encyclopedia of Chem. Technol. vol. 16, 162–65 (1968).

MELVIN GOLDSTEIN, Primary Examiner

U.S. Cl. X.R.

260—75 T